United States Patent [19]

Kojima et al.

[11] Patent Number: 5,548,886
[45] Date of Patent: Aug. 27, 1996

[54] METHOD OF MANUFACTURING FLOATING MAGNETIC HEAD DEVICE

[75] Inventors: Naoto Kojima; Takashi Watanabe; Hiroyuki Takahashi, all of Miyagi; Akio Mishima, Kanagawa, all of Japan

[73] Assignee: Sony Corporation, Japan

[21] Appl. No.: 295,431

[22] Filed: Aug. 25, 1994

[30] Foreign Application Priority Data

Aug. 31, 1993 [JP] Japan .................................. 5-216760

[51] Int. Cl.$^6$ ................................................ G11B 5/127
[52] U.S. Cl. .................. 29/603.1; 29/603.09; 29/603.16; 29/603.17; 29/603.12
[58] Field of Search .............................. 29/603, 417, 423, 29/559, 603.07, 603.1, 603.12, 603.16, 603.17, 603.09, 407.04, 407.08; 451/1, 6, 9, 29, 31, 41, 78

[56] References Cited

U.S. PATENT DOCUMENTS

| 4,188,247 | 2/1980 | Ridgway et al. | 451/29 X |
| 5,321,882 | 6/1994 | Zarouri et al. | 29/423 X |
| 5,442,850 | 8/1995 | Kerth | 29/603 |

FOREIGN PATENT DOCUMENTS

| 0499473 | 8/1992 | European Pat. Off. . |
| 60-242561 | 12/1985 | Japan . |
| 63-157381 | 6/1988 | Japan . |
| 3149184 | 6/1991 | Japan . |

*Primary Examiner*—S. Thomas Hughes
*Attorney, Agent, or Firm*—Ronald P. Kananen

[57] ABSTRACT

A method of manufacturing a floating magnetic head device includes forming a pedestal on a substrate by positioning and adhering a plurality of blocks each having a plurality magnetic head elements, on the substrate in a manner that the magnetic gaps between the magnetic head elements are linearly arrayed and so the blocks are parallel and equidistantly spaced. A resist mask having a predetermined slider surface shape is formed on the blocks and injection of a solid/gaseous two-phase current of free abrasive grains and gas is carried out through an injection nozzle. The pedestal is then sliced into individual slider units.

11 Claims, 7 Drawing Sheets

METHOD OF MANUFACTURING FLOATING MAGNETIC HEAD DEVICE

BACKGROUND OF THE INVENTION

1. Field of the Invention

This invention relates to a method of manufacturing a floating magnetic head device used for a hard disk drive unit or a floppy disk drive unit.

2. Description of the Related Art

The floating magnetic head device used for a hard disk drive unit for recording or reproducing information into or from a hard disk has a magnetic head element for recording and reproducing of information loaded on a slider, and has the slider supported by a suspension composed of a blade spring. The slider is mounted on an actuator arm rotating in the radial direction of the hard disk.

The slider is caused to contact the surface of the hard disk by downward spring load applied from the suspension when the hard disk is not rotated. When the hard disk is rotated, the slider is caused to float by upward lift due to an air current generated by the rotation of the hard disk. As the downward spring load is applied to the slider from the suspension, the slider having the magnetic head element loaded thereon floats in running with a slider floating distance determined by a balance of the upward lift and the downward spring load. The slider rubs the hard disk immediately before actuation and termination of operation.

In the floating magnetic head device as described above, protrusions and grooves are provided on the hard disk facing surface of the slider to shorten the rubbing time with the hard disk and to improve durability, and the upward lift applied to the slider is adjusted to adjust the slider floating distance. For instance, rail processing is carried out on the hard disk facing surface of the slider to form slider rails as substantially rectangular protrusions thereon. The hard disk facing surface of the slider rail is used as an air bearing surface to receive the air current generated on the hard disk surface. A groove called an air groove which the air current enters is provided between the slider rails, to adjust the slider floating distance. The projections and groove are formed by mechanical processing.

However, as a reduction in size of the hard disk drive unit has been recently required, a reduction in size of the slider constituting the floating magnetic head device is required. Consequently, the above-mentioned mechanical processing of the slider is becoming more difficult on the basis of precision.

Also, as a higher recording density of the hard disk drive unit has been recently required, a lower floating distance and stability of the slider floating distance of the floating magnetic head device are required. However, the lower floating distance and stability of the slider floating distance are difficult in the floating magnetic head device using the slider having slider rails as substantially rectangular protrusions provided on the hard disk facing surface thereof as described above.

Thus, floating magnetic head devices using various sliders having slider rails and air bearing surfaces which are improved in shape are proposed. However, these sliders have slider rails which are not simple in shape, and are more difficult to process by mechanical processing. As methods of processing such sliders, vacuum etching such as ion milling, and powder beam processing using fine abrasive grains, as disclosed in the JP Laid-Open (KOKAI) Publication No.3-149184, are proposed. However, mass production of the sliders processed by the above-mentioned ion milling or the powder beam processing is difficult. Therefore, the floating magnetic head device using such sliders is considered to be impractical.

OBJECT AND SUMMARY OF THE INVENTION

In view of the above-described status of the art, it is an object of the present invention to provide a method of manufacturing a floating magnetic head device whereby it is possible to easily process a slider having slider rails of arbitrary shape, to easily achieve mass production of the sliders, and to manufacture a floating magnetic head device of satisfactory properties.

According to the present invention, there is provided a method of manufacturing a floating magnetic head device having the steps of: forming a pedestal on a substrate by positioning and adhering plural blocks having plural magnetic head elements loaded thereon on the substrate in such a manner that magnetic gaps of the magnetic head elements of the different blocks are linearly arrayed and that the plural blocks are in parallel to one another with equal intervals; forming a resist mask having a predetermined slider surface shape on the block of the pedestal; injecting a solid/gaseous two-phase current of free abrasive grains and gas on to a resist mask forming surface of the pedestal through an injection nozzle; and slicing the pedestal into sliders of predetermined size.

In the method of manufacturing a floating magnetic head device according to the present invention, the pedestal is formed by adhering the plural blocks on the substrate with position precision of ±10 µm for linearly arraying the magnetic gaps of the magnetic head elements of the different blocks.

In addition, in the method of manufacturing a floating magnetic head device according to the present invention, the pedestal is formed by adhering the plural blocks on the substrate with the blocks being not in contact with one another.

Further, in the method of manufacturing a floating magnetic head device according to the present invention, the free abrasive grains have an average diameter of 10 µm or smaller, and the pedestal has its surface edge roundly processed by injecting the free abrasive grains through blend processing. The solid/gaseous two-phase current of free abrasive grains and gas is injected through an injection nozzle having an injection opening with a horizontally long rectangular cross section, and the rectangular cross section of the injection opening of the injection nozzle has its both sides squeezed to be round.

The method of manufacturing a floating magnetic head device has the steps of: forming a pedestal on a substrate by positioning and adhering plural blocks having plural magnetic head elements loaded thereon on the substrate in such a manner that magnetic gaps of the magnetic head elements of the different blocks are linearly arrayed and that the plural blocks are in parallel to one another with equal intervals; forming a resist mask having a predetermined slider surface shape on the block of the pedestal; injecting a solid/gaseous two-phase current of free abrasive grains and gas on to a resist mask forming surface of the pedestal through an injection nozzle; and slicing the pedestal into sliders of predetermined size. Therefore, the portion not having the resist mask of the pedestal is processed, so that an arbitrary shape of the slider surface can be easily formed. Since the plural blocks are accurately positioned, the processing precision of the pedestal is satisfactory. In the conventional manufacturing method, since the blocks having plural magnetic head elements loaded thereon are processed one by one, the processing precision differs between the blocks. However, as the plural blocks are processed at a time in the present invention, the processing precision does not differ between blocks. Also, the processing of the plural blocks improves mass productivity as a matter of course.

BRIEF DESCRIPTION OF THE DRAWINGS

FIG. 8 is a view for explaining the second method of positioning a magnetic gap of the magnetic head element of the block with predetermined position precision, further in detail.

DETAILED DESCRIPTION OF THE PREFERRED EMBODIMENT

A preferred embodiment of the present invention will now be described with reference to the accompanying drawings.

First, a floating magnetic head device produced by the method of manufacturing a floating head device of the present embodiment will now be described.

Figure 1:
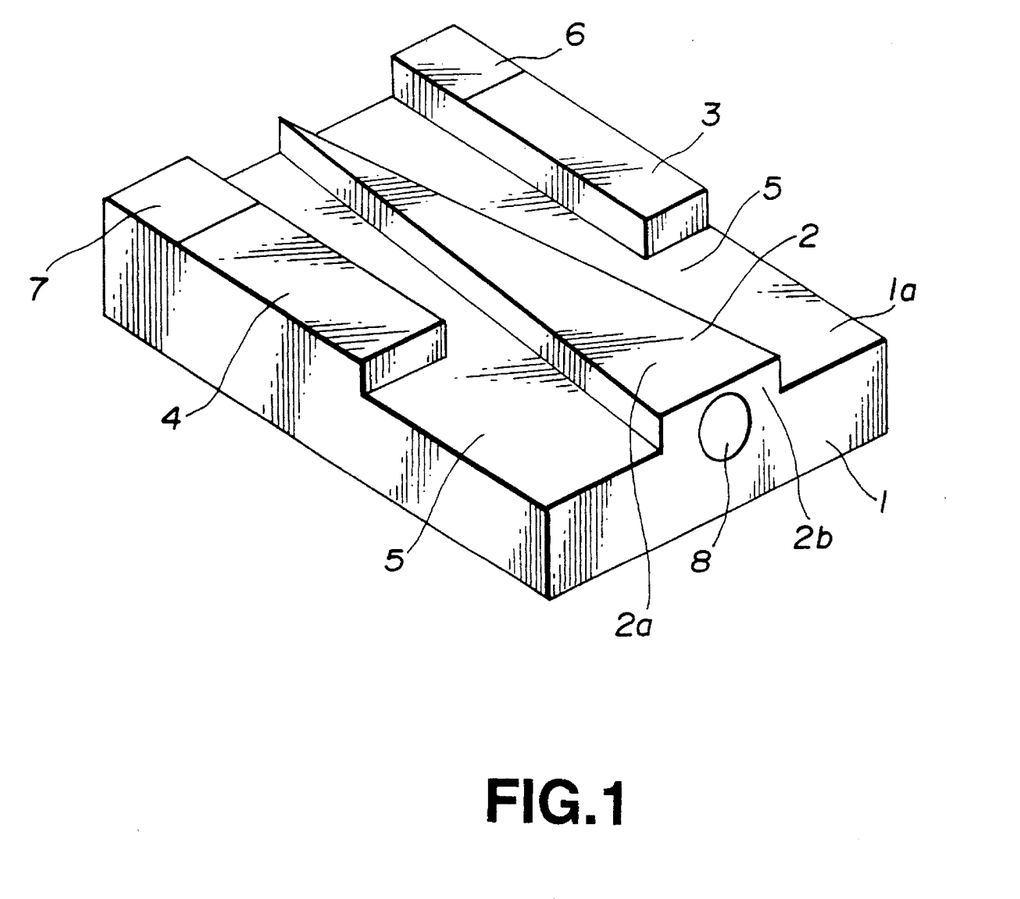
FIG. 1 is a perspective view showing a floating magnetic head device produced in an embodiment of the method of manufacturing a floating magnetic head device according to the present invention.

The floating magnetic head device has a slider 1 and a magnetic head element 8, as shown in FIG. 1. The slider 1 has a slider rail 2 which comprises an isosceles triangle shaped protrusion which lies on the center line on a hard disk facing surface 1a, and side rails 3, 4 which comprise rectangular protrusions formed on either side of the slider rail 2. An air groove 5 is formed between the slider rail 2 and the side rails 3, 4. The slider rail 2 is so formed that the base of the isosceles triangle is located on the air outlet end side. The side rails 3, 4 have tapers 6, 7 defined by extremely moderate inclined planes with an angle of 1° at the air inlet end side. The side rails 3, 4 are formed up to the intermediate portion in the longitudinal direction of the slider 1 from the air inlet end. The slider 1 is composed of a material generally used for this type of slider, exemplified by a hard ceramic material such as $Al_2O_3$ and TiC or potassium titanate. The magnetic head element 8 is arranged orthogonally with respect to an air bearing surface 2a of the slider rail 2 and is provided on one side an edge surface 2b as the air outlet end so as to have its magnetic gap exposed to the air bearing surface 2a. As the magnetic head element 8, any bulk head such as a thin film head or a MIG head can be used.

The method of manufacturing a floating magnetic head device of the present embodiment is now described in the order of processes. First, a plurality of plane blocks having magnetic head elements loaded at equal intervals on one major surface of the blocks are prepared. The material forming the block and the magnetic head element are as described above.

Figure 2:
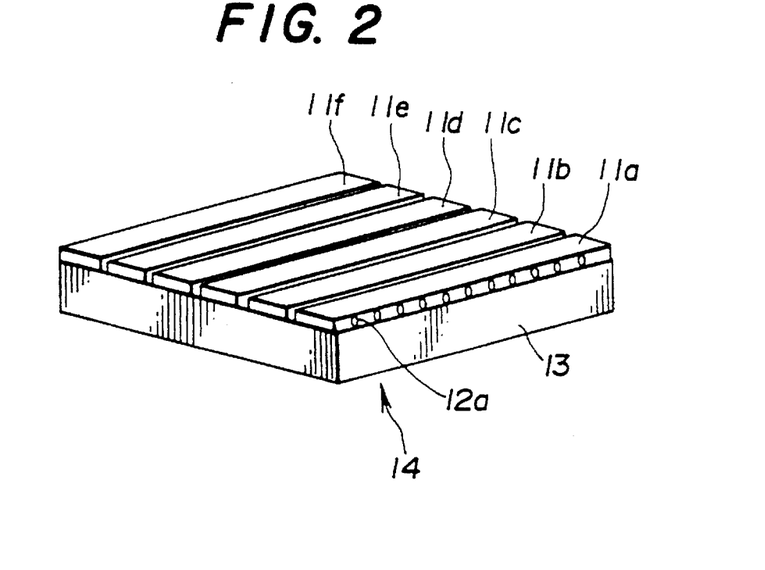
FIG. 2 is a perspective view showing a process of forming a pedestal in the order of processes of the embodiment of the method of manufacturing a floating magnetic head device according to the present invention.
Figure 3:
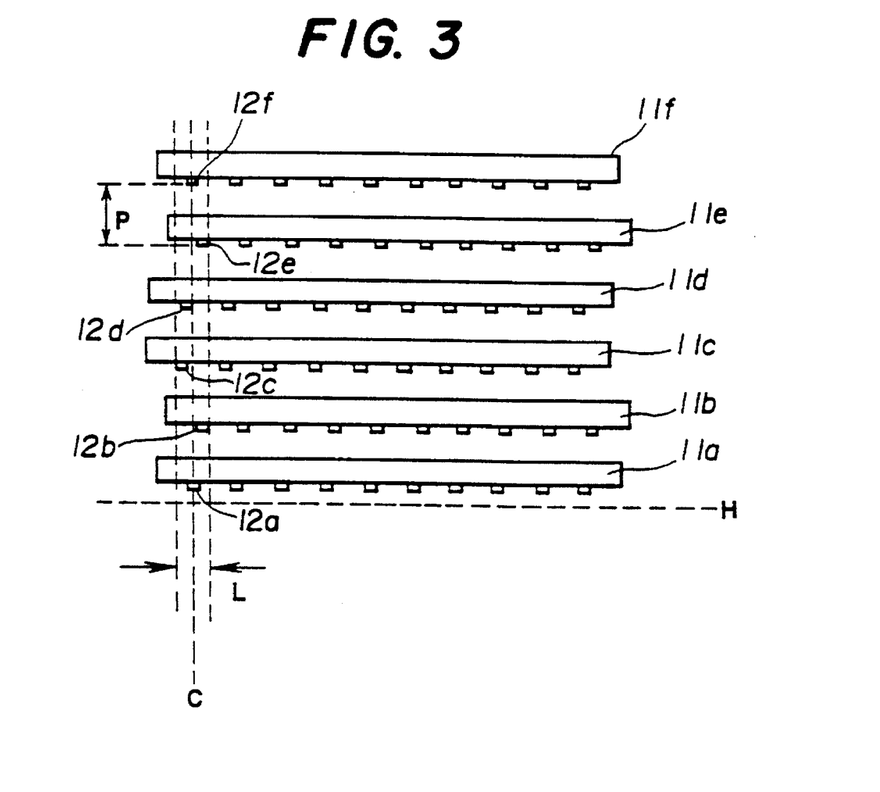
FIG. 3 is a view showing positional relations of blocks and magnetic head elements of the pedestal in the process of forming the pedestal.

The plural blocks 11, that is, 6 blocks 11a to 11f in the present embodiment, are adhered (viz., bonded) on a substrate 13 with either an instantaneous adhesive or a photosensitive adhesive so that magnetic head elements 12a to 12f of the blocks 11a to 11f have their respective magnetic gaps linearly arrayed and so that the plural blocks 11 are positioned in parallel to one another with equal intervals, as shown in FIGS. 2 and B. Thus, a pedestal 14 is formed. The plural blocks 11 are positioned so as to not contact one another and thus prevent the separation of gold plate on the magnetic head elements 12. If the blocks 11 are off set and are not parallel to a reference line H, stacking the blocks 11 accumulates positional errors. Therefore, the blocks are positioned one-by-one so as to be parallel to one another and thus avoid the above-mentioned problem.

The pedestal 14 is treated with slider surface shape processing with the above-described slider rail and side rails in a subsequent process, and is sliced into sliders of predetermined size. Thus, the above-described floating magnetic head device is produced. Consequently, the precision of the slider surface shape and of the slider outer dimension is determined by the positional precision of the plurality of blocks 11 which comprise the pedestal 14. In the floating magnetic head device as described above, the slider rail 2 requires a positional precision of ±10 to 20 μm with respect to the magnetic gap of the magnetic head element 8, and the slider 1 requires outer dimension precision of ±50 to 100 μm in relation to the magnetic gap of the magnetic head element 8. Consequently, in order to assure such precision, it is necessary to increase the positional precision of the plural blocks 11 for forming the pedestal 14 to within a range of ±10 μm, as described above. That is, it is necessary to position the blocks 11 with a pitch P as shown in FIG. 3 which is sufficiently precise as to exhibit a variation within a range of ±10 μm, and with a deviation L (positional precision) from a reference line C of the magnetic gaps of the magnetic head elements 12a to 12f of the blocks 11a to 11f limited within a range of ±10 μm.

The method of positioning the magnetic gaps of the magnetic head elements 12 of the plural blocks 11 with the above-described precision can be exemplified as follows.

Figure 4A:
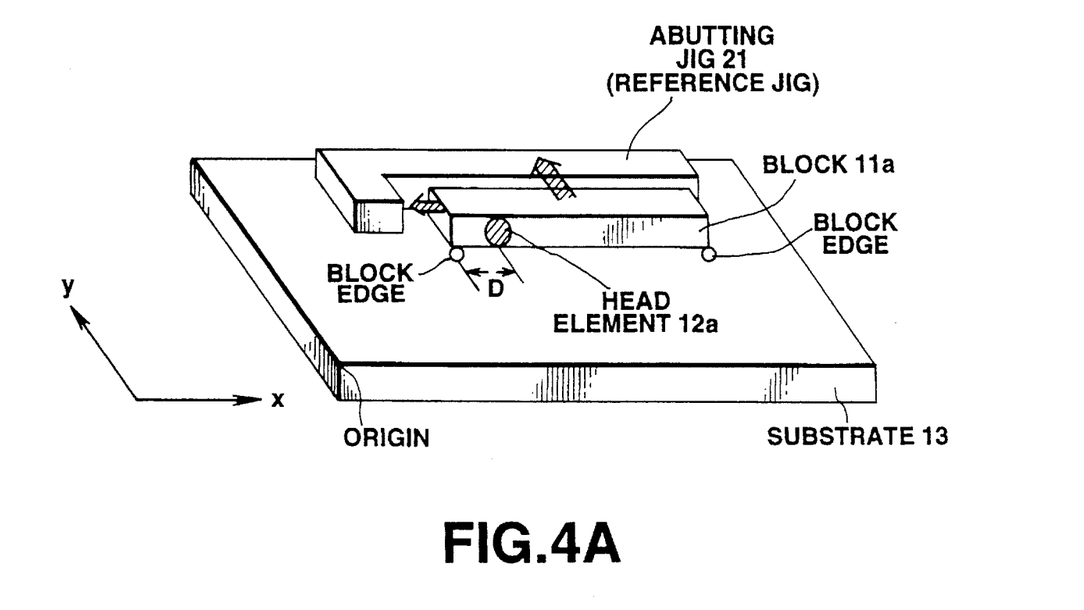
FIGS. 4A and 4B are views for explaining a first method of positioning a magnetic gap of the magnetic head element of the block with predetermined position precision.
Figure 4B:
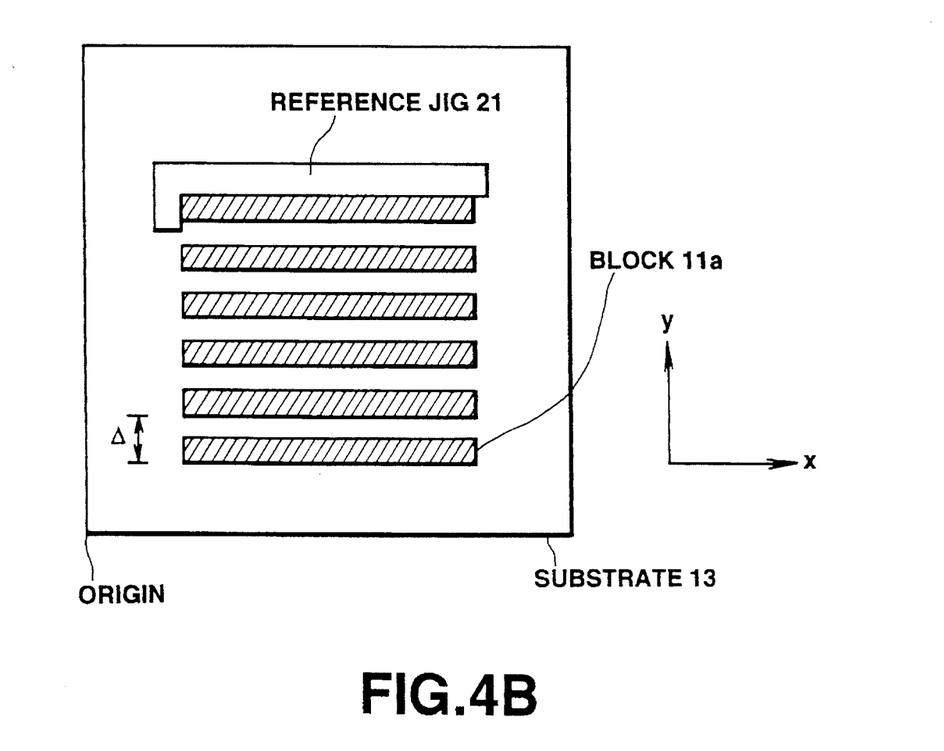

The first method includes individually positioning each of the plural blocks using an abutting jig so as to achieve the improved loading position precision required by the magnetic head elements 8 of the blocks 11, as shown in FIGS. 4A and 4B. In this process, each block 11 is mechanically abutted against an abutting jig (reference jig) 21 using vacuum chucking. With the vacuum chucking, several holes are opened along the lateral sides of the jig 21 in its x and y directions, so that the block can be gripped through the holes by vacuum suction.

After the block 11 is abutted against the abutting jig 21, the block 11 is fixed to the substrate 13 with an instantaneous adhesive applied to the block edge. By slicing the block 11 in advance with a grindstone before the block 11 is abutted to the abutting jig 21, the distance D from the block edge to the first head gap is set within a required range of precision, for example, ±5 µm or less, in each block.

By abutting these blocks to the abutting jig 21, the head element positional precision between predetermined blocks can be obtained. Each of the blocks can be positioned at a predetermined interval Δ by moving the jig 21 or the substrate 3.

According to this method, the improved loading position precision of the magnetic head element makes it possible to improve the positional precision of the magnetic gap in relation to the abutment surface of the block 11 within a range of ±5 µm at the time of loading the magnetic head element 8. Therefore, the above position precision can be achieved irrespective of abutment errors which occur with to the abutting jig.

Figure 5:
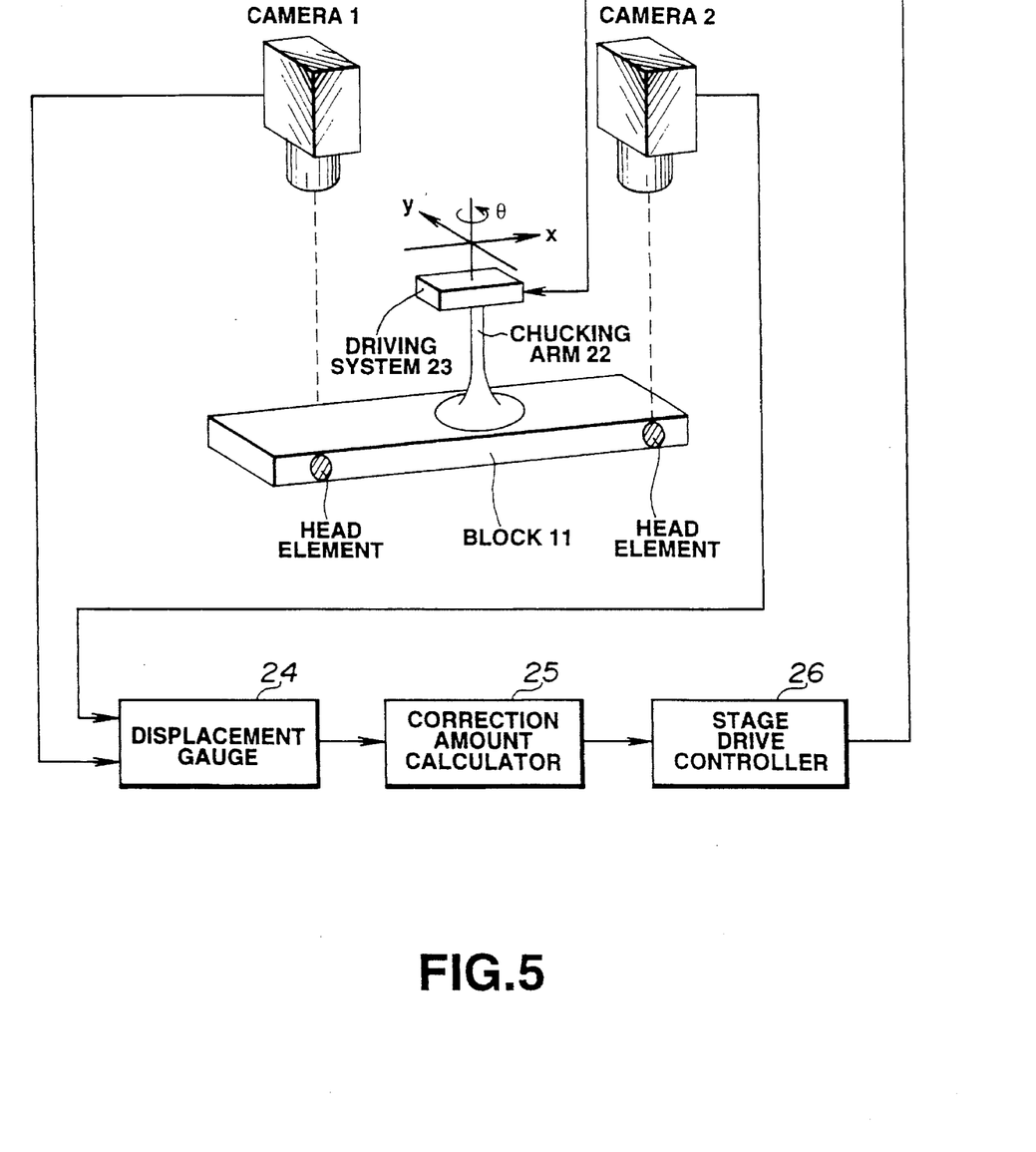
FIG. 5 is a view for explaining an image processing device used for a second method of positioning a magnetic gap of the magnetic head element of the block with predetermined position precision.
Figure 6:
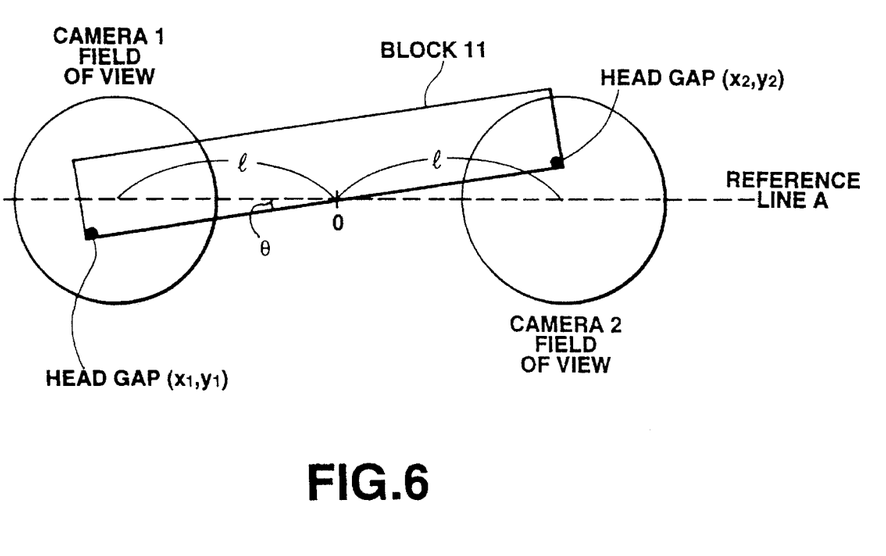

The second method includes positioning the plural blocks 11 by reading out (viz., detecting) the position of the magnetic gaps of the magnetic head elements 12 of the blocks 11 by using an image processing device, as shown in FIG. 5. This device employs two cameras for reading out the positions of head gaps on both ends of each block. A displacement gauge 24 detects a distortion in a plane (x, y) and seconds of arc or correction angle θ from the information read out by the cameras. The distortion in the plane (x, y) and the seconds of arc θ are obtained by detecting the interval Δ between desired blocks and a distortion L from a reference line L of the head element of each block.

Figure 8A:
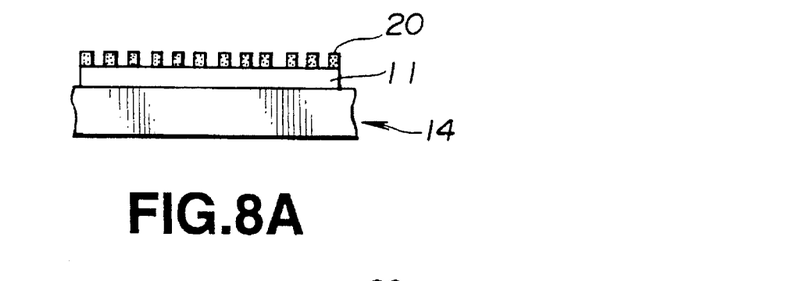
FIGS. 8A and 8B are side views showing a process of forming a resist mask on the pedestal.
Figure 8B:
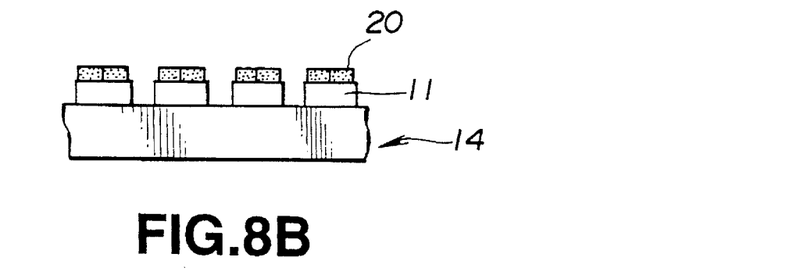

In further detail, an intermediate point of the optical axis between the cameras is used as the origin O, and coordinates of each camera image in relation to the origin O are calculated, as shown in FIG. 8. The correction angle θ is calculated from an angle made by a line connecting head gaps on both ends of the block and a reference line A connecting two optical axis centers of the cameras. Also, the amount of distortion in the in-plane direction is calculated so that an intermediate point between positions of the two gaps $(x_1, y_1)$ and $(x_2, y_2)$ coincides with the origin 0.

A correction amount calculator 25 calculates the required amount of correction of block position by using the information obtained by the displacement gauge 24. Then, a chucking arm 22 used for chucking the block is finely controlled in the x, y and θ directions through a stage drive controller 26 and a driving system 23. According to this second method, positional precision can be improved further.

Figure 7:
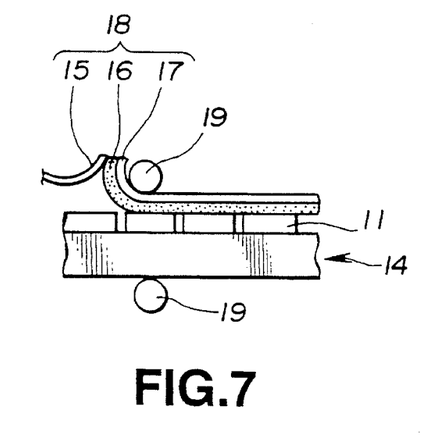
FIG. 7 is a side view showing a process of adhering a sheet resist onto the block of the pedestal.

Then, a resist mask having the above-described slider surface shapes is formed on the pedestal 14 A sheet resist 18 composed of a base film 15, a photoresist 16 and a protection 17, is applied to the blocks As shown in FIG. 7, the photoresist 16 remains in contact with the blocks 11 while the base film 15 is peeled off. The sheet resist 18 provided on the blocks 11 is pressed down by rolls 19 to achieve a heat-press bonding. The photoresist 16 can be composed of a negative photosensitive resin, and the sheet resist 18 may be exemplified by a type produced by Tokyo Ouka. A metallic photomask having the above slider surface shapes is provided on the photoresist 16, and the slider surface shapes are transferred onto the photoresist 16 by exposure.

It is a matter of course that the photomask has the slider surface shapes in a position corresponding to the slider forming position of the blocks of the pedestal 14 so that the slider surface shapes can be appropriately transferred to the blocks 11. Then, an alkalescent solution such as an $Na_2CO_3$ solution is sprayed onto the photoresist 18, and development is carried out. Thus, a resist mask 20 having the slider shapes is formed on the pedestal 14 in the manner shown in FIGS. 8A and 8B.

Figure 9:
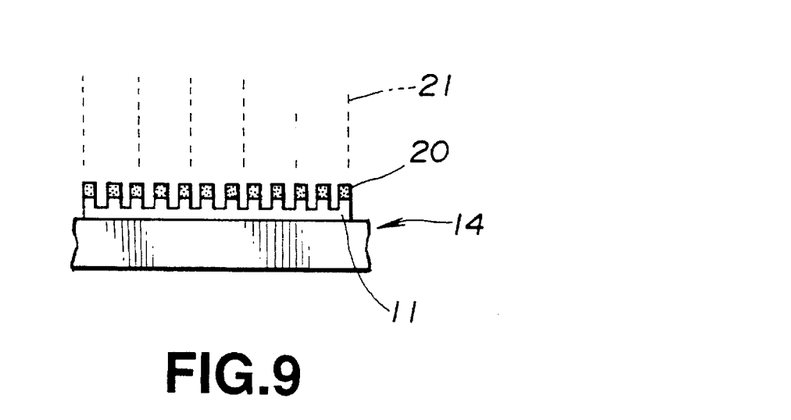
FIG. 9 is a side view showing a process of carrying out powder beam processing on the pedestal.

As shown in FIG. 9, a solid/gaseous two-phase current of free fine abrasive grains 21 and gas, not shown, is injected onto the forming surface of the resist mask 20 of the pedestal 14 through an injection nozzle, not shown. Thus, the pedestal 14 is processed into a predetermined shape. Such a processing method is commonly known as powder beam processing.

The free fine abrasive grains are exemplified by abrasive grains of high hardness such as SiC, $B_4C$, CBN and diamond powder, having an average grain diameter of 10 µm or smaller. The free fine abrasive grains 21 are carried by a dry carrier gas with a gas pressure of 1 to 10 $kg/cm^2$ and are injected onto the pedestal 14. The resist mask 20 having the slider shapes is formed on the pedestal 14, and only the portions of each of the blocks 11 which is to be processed is exposed. Thereafter, a fusillade of free fine abrasive grains 21 are directed against the exposed surface at high speed, suitably abrading the surface of the blocks 11. Consequently, the surfaces of the blocks 11 are processed into a surfaces having slider surface shapes.

In the powder beam processing, the processing speed and the surface roughness of the processing surface are controlled by the grain diameter of the free fine abrasive grains and the dynamic pressure of the carrier gas. The processing speed increases if either the grain diameter of the free fine abrasive grains or the dynamic pressure of the carrier gas increases. On the contrary, the surface property is improved as the grain diameter is reduced with decreasing dynamic pressure. Consequently, it is preferred to limit the average diameter of the free fine abrasive grain within a range of 10 µm or less. It is also possible to carry out rough processing and finishing with a single device utilizing the above-described characteristics.

Figure 11:
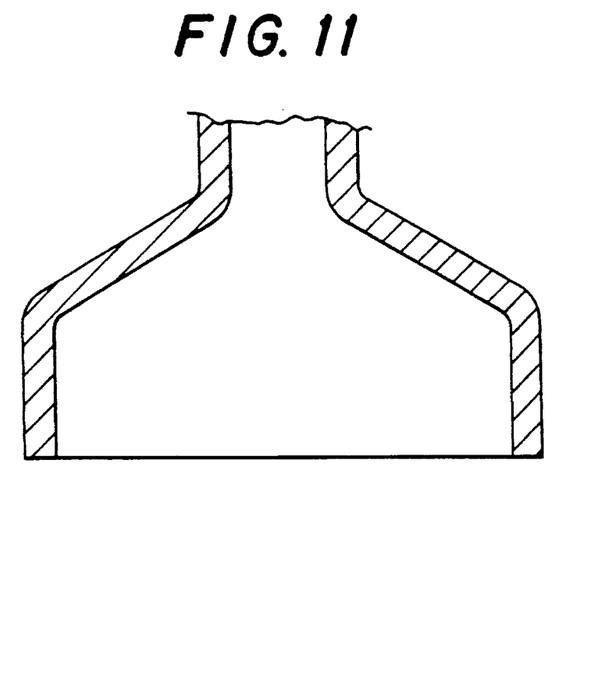
FIGS. 11 and 12 are sectional elevation and plan views of a nozzle which can be used in accordance with the embodiments of the invention.
Figure 12:
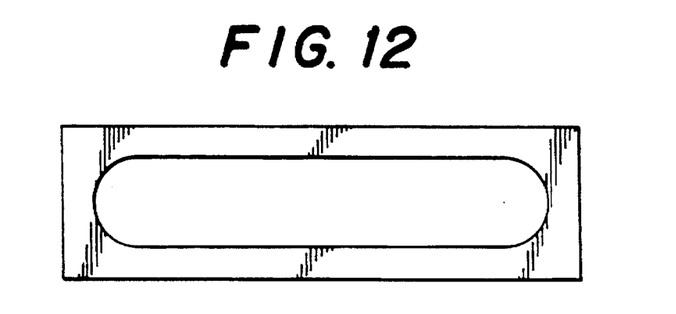

In addition, as the injection nozzle for injecting the free fine abrasive grains and the carrier gas, an injection nozzle having a uniform injection pressure over the entire nozzle injection opening is preferred for producing a uniform processing depth. For instance, an injection nozzle having an injection opening which has a horizontally long rectangular cross-section and which has rounded ends in the manner shown in FIGS. 11 and 12 is preferred.

Meanwhile, in the floating magnetic head device as described above, blend processing is carried out for rounding the edge of the slider so as to prevent damages to the hard disk by sharp edges. Conventionally, the blend processing is carried out by mechanical processing. However, as the slider has been reduced in size, it is difficult to carry out the blend processing by mechanical processing. Thus, the blend processing may be carried out by the powder beam processing or after the slider surface shape processing is carried out as described above.

Figure 10:
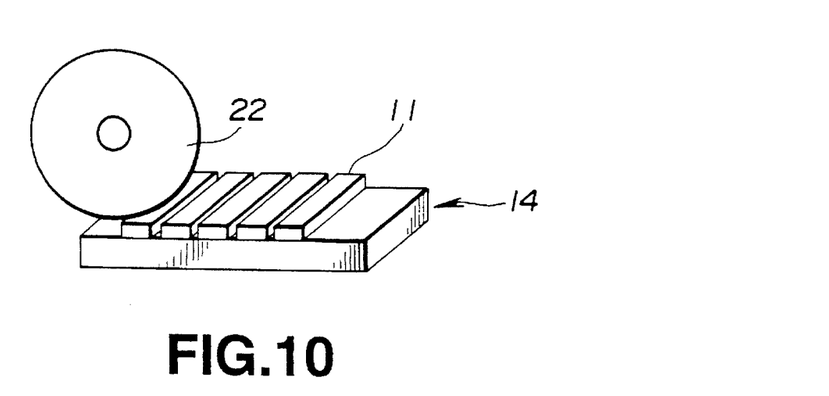
FIG. 10 is a perspective view showing a process of slicing the pedestal.

Finally, the plural blocks 11 which comprise the pedestal 14 are sliced into sliders of a predetermined size by a rotating diamond grindstone 22, as shown in FIG. 10, so as to produce the floating magnetic head device composed of the slider 1 and the magnetic head element 8 as shown in FIG. 1.

In the method of manufacturing a floating magnetic head device of the present embodiment, as the pedestal surface is processed by the powder beam processing, slider rails of any arbitrary shape can be easily formed in the blocks of the pedestal. Also, the powder beam processing improves the processing speed in comparison to the ion milling method. In addition, since a preliminary stage such as evacuation prior to the processing is not needed, the time for the entire processing can be significantly reduced in comparison to the ion milling method, and satisfactory mass production can be achieved. The device is relatively simple, and the cost of the device for mass production can be lower than that of an ion milling device. Consequently, the method of manufacturing a floating magnetic head device according to the present invention is suitable for mass production.

Also, in the method of manufacturing a floating magnetic head device according to the present invention, the pedestal is formed with the plural blocks accurately positioned, and the slider surface shape processing is carried out on the pedestal at the same time. Then, the pedestal is sliced into predetermined size units. Therefore, the processing precision does not differ between blocks, and the accurate positioning generates satisfactory processing precision. Thus, the floating magnetic head device of satisfactory properties can be stably produced.

Further, in the conventional method of manufacturing a floating magnetic head device, the blocks having the plural magnetic head elements loaded thereon are processed one by one. However, since the plurality of blocks are processed at a time in the present embodiment, mass productivity can be significantly improved. Conventionally, one block is fixed on the processing device for slider surface shape processing, and then the plural blocks are positioned to be fixed again on the processing device for slicing. The positioning process is highly complicated, and the positional precision of the blocks is lowered. The positioning process also alters the surface curvature, causing irregularities in floating properties of the slider of the floating magnetic head device to be produced. However, in the method of manufacturing a floating magnetic head device of the present embodiment, the entire manufacturing process is carried out with the blocks integrated in one unit as the pedestal. Therefore, no complex operation is carried out, and properties of the blocks are not altered in the manufacturing process.

What is claimed is:

1. A method of manufacturing a floating magnetic head device comprising the steps of:

forming a pedestal on a substrate by individually positioning and adhering a plurality of blocks, each having a plurality of magnetic head elements loaded thereon, onto the substrate in such a manner that magnetic gaps of the magnetic head elements on each of the plurality of blocks are linearly arrayed and so that the plurality of blocks are parallel to one another and spaced at equal intervals;

forming a resistant mask having a plurality of predetermined slider surface shapes on the pedestal formed comprised of the plurality of blocks;

injecting a solid/gaseous two-phase current of free abrasive grains and a carrier gas onto surfaces of the blocks exposed by the resist mask through an injection nozzle; and slicing the pedestal into sliders of predetermined size.

2. The method of manufacturing a floating magnetic head device as claimed in claim 1, wherein the plurality of blocks are disposed on the substrate with a positional precision wherein the linearly arrayed magnetic gaps deviate from predetermined positions by a maximum of ±10 μm.

3. The method of manufacturing a floating magnetic head device as claimed in claim 1, wherein the plurality of blocks on the substrate are arranged to that they do not in contact with one another.

4. The method of manufacturing a floating magnetic head device as claimed in claim 1, wherein the free abrasive grains have an average diameter of 10 μm and smaller.

5. The method of manufacturing a floating magnetic head device as claimed in claim 1, wherein edge surfaces of the sliders are rounded off by using a blend process wherein the diameter of the free abrasive grains and the dynamic pressure of the carrier gas are selectively varied.

6. The method of manufacturing a floating magnetic head device as claimed in claim 1, wherein the solid/gaseous two-phase current of free abrasive grains and gas is injected through an injection nozzle having an injection opening with an elongate rectangular cross-section.

7. The method of manufacturing a floating magnetic head device as claimed in claim 6, wherein the injection nozzle has rounded ends and is arranged to apply an essentially uniform injection pressure.

8. A method of manufacturing a floating magnetic head device as set forth in claim 1, wherein said step of forming the pedestal includes positioning the blocks on the substrate so that a surface on which the magnetic heads are loaded is essentially vertical with respect to the substrate.

9. A method of manufacturing a floating magnetic head device comprising the steps of:

preparing a plurality of elongate blocks;

disposing a plurality of magnetic heads on a predetermined surface of each of the blocks so that the heads are arranged in a predetermined spaced aligned relationship;

locating and adhering each of the blocks one-by-one in a spaced parallel relationship on a substrate using a jig;

forming a resist mask over the plurality of blocks;

powder beam processing the surfaces of the blocks which are exposed through the resist mask;

removing the mask and slicing the blocks into individual magnetic head units.

10. A method as set forth in claim 9, wherein said step of locating and adhering further comprises:

detecting positions of predetermined magnetic head units on a block using camera means and determining the actual alignment between the detected heads; and adjusting, as required, the position of the block to bring the actual alignment between the detected heads into agreement with a predetermined required alignment prior to adhering the block to the substrate.

11. A method as set forth in claim 9, wherein said step of locating and adhering further comprises: setting the blocks on the substrate so that the surface on which the magnetic heads are disposed is vertical with respect to the substrate.

* * * * *